United States Patent [19]

Watanabe et al.

[11] Patent Number: 5,373,057
[45] Date of Patent: Dec. 13, 1994

[54] RESIN COMPOSITION AND COPOLYMER

[75] Inventors: Kazushi Watanabe, Hyogo, Japan; Akihiro Inozuka, Amherst, Mass.

[73] Assignee: Daicel Chemical Industries, Ltd., Japan

[21] Appl. No.: 27,924

[22] Filed: Mar. 8, 1993

Related U.S. Application Data

[63] Continuation of Ser. No. 554,744, Jul. 18, 1990, abandoned.

[30] Foreign Application Priority Data

Jul. 20, 1989 [JP] Japan .................. 1-188113
Dec. 27, 1989 [JP] Japan .................. 1-343724
Jan. 23, 1990 [JP] Japan .................. 2-13410

[51] Int. Cl.$^5$ ............... C08L 67/02; C08L 77/02; C08L 77/06
[52] U.S. Cl. ............... 525/166; 525/176; 525/179; 525/182
[58] Field of Search ........................ 525/166

[56] References Cited

FOREIGN PATENT DOCUMENTS 0278500 8/1988 European Pat. Off. .
0304041 2/1989 European Pat. Off. .
60-086163 5/1985 Japan .
1221453 9/1989 Japan .

OTHER PUBLICATIONS

Derwent Abstract for Japanese 60-86163.
Derwent Abstract for Japanese 1-221453.

*Primary Examiner*—Patricia A. Short
*Attorney, Agent, or Firm*—Flynn, Thiel, Boutell & Tanis

[57] ABSTRACT

A molding resin composition comprises 70 to 99.5 wt. % of a mixture A comprising (a) 5 to 95 wt. % of a polyamide and (b) 95 to 5 wt. % of a thermoplastic polyester and 0.5 to 30 wt. % of a copolymer B obtained from (c) 80 to 98 wt. % of an aromatic vinyl compound, (d) 19 to 1 wt. % of alpha, beta-unsaturated carboxylic acid compound and (e) 19 to 1 wt. % of an unsaturated epoxy compound. It may further comprise (f) 50 to 10 wt. % of glass fiber.

1 Claim, 1 Drawing Sheet

RESIN COMPOSITION AND COPOLYMER

This application is a continuation of U.S. Ser. No. 07/554,744, filed Jul. 18, 1990, now abandoned.

The present invention relates to a molding resin composition which is useful as a molding material. More particularly, it relates to a molding resin composition prepared by homogeneously blending a polyamide resin, a thermoplastic polyester resin, a specific terpolymer and a glass fiber at a specified ratio, which is extremely excellent in mechanical strengths, heat resistance and moldability.

The present invention relates to a styrene-maleic anhydride-glycidyl methacrylate random copolymer available as a polymeric modifier or a polymeric compatibilizer capable of improving the compatibility of a multicomponent polymer system.

PRIOR ART

Recently, a polyamide resin has been used also as a molding material by virtue of its excellent physical and chemical properties. This is because it exhibits high mechanical strengths, excellent abrasion resistance, chemical resistance, heat resistance and relatively excellent electrical properties, so that it has satisfactory performances required of an engineering plastic. However, the resin has also undesirable properties due to the water absorption by the amido (—CONH—) group, such as dimensional change or decreasing in the mechanical strengths, so that the marketability thereof as a molding material is limited in some cases.

On the other hand, a thermoplastic polyester resin does not cause any decreasing in the physical properties due to water absorption and exhibits excellent physical and chemical properties like the polyamide resin, so that it has been widely used as a molding material. However, the resin decreases remarkably in the mechanical strengths when exposed to hot water for a long time.

Although various attempts to overcome the defects of a polyamide resin and a thermoplastic polyester resin by the mere blending of both of the resins have been made, mere blending of both resins brings about deterioration of the excellent properties inherent in these resins, which makes the practical use thereof impossible.

Further, although a process characterized by conducting the blending of the above resins in the course of the polymerization thereof has been proposed in, for example, Japanese Patent Laid-Open Nos. 103191/1976 and 42645/1981 as a blending process by which the defects of the resins can be overcome and which is free from the decreasing in the mechanical strengths which occurs in the mere blending, this process necessitates large-scale equipment and takes a prolonged time for the blending, thus being unpractical.

Furthermore, a composition prepared by incorporating a glass fiber into a mixture comprising a polyamide resin and a thermoplastic polyester resin for reinforcement is poor in moldability to give a molded article unsatisfactory in mechanical strengths.

The inventors of the present invention have intensively studied for the purpose of overcoming the defects of a polyamide resin and a thermoplastic polyester resin by blending both of the resins by means of simple melt kneading using an extruder or the like without deteriorating the excellent properties inherent in the resins and have found that the purpose can be attained by homogeneously blending a specified amount of a specified copolymer with a polyamide resin and a thermoplastic polyester resin and that even when a glass fiber is further incorporated, the obtained composition exhibits good processability and satisfactory mechanical strengths. The present invention has been accomplished on the basis of these findings.

Molecules of polymers of different kinds in a multicomponent polymer system are generally insoluble in each other, so that it is necessary to improve the dispersed state thereof in order to utilize the advantages of the polymer blended with each other.

Polymers A and B which are incompatible with each other in a blend of them can be compatibilized by adding a small amount of a block or graft copolymer comprising a polymer compatible with the polymer A and another polymer compatible with the polymer B.

Such a polymeric modifier capable of reducing the interfacial tension between the polymers is called compatibilizer.

Various polyolefins and polystyrenes modified by copolymerization with a monomer laving a reactive group have been heretofore used as the compatibilizer. Examples of the polymer capable of improving the compatibility between a polyester resin and a polyamide resin include an ethylene-unsaturated glycidyl copolymer used in Japanese Patent Laid-Open No. 217260/1985, a carboxylic acid-or maleic anhydride-modified polyolefin used in Japanese Patent Laid-Open No. 213256/1986 and a polystyrene modified with an, $\alpha,\beta$-unsaturated carboxylic acid or its derivative used in Japanese Patent Laid-Open No. 221453/1989. However, the effect of them in homogenizing the two phases is insufficient, since all of the monomers incorporated into the main chain polymer for the purpose of modification selectively react with the polyester resin or polyamide resin.

SUMMARY OF THE INVENTION

In the invention the molding resin composition comprises 70 to 99.5 wt. % of a mixture A comprising (a) 5 to 95 wt. % of a polyamide and (b) 95 to 5 wt. % of a thermoplastic polyester and 0.5 to 30 wt. % of a copolymer B obtained from (c) 80 to 98 wt. % of an aromatic vinyl compound, (d) 19 to 1 wt. % of alpha, beta-unsaturated carboxylic acid compound and (e) 19 to 1 wt. % of an unsaturated epoxy compound. It may further comprise (f) 50 to 10 wt. % of glass fiber, based on 50 to 90 wt. % of the composition of the mixture A and the copolymer B.

In the invention the mixture A and the composition are produced by mixing, blending or kneading the respective components with one another.

It is preferable that the copolymer B is obtained from styrene, maleic anhydride and glycidyl methacrylate, in particular comprising 80 to 99 wt. % of styrene units, 0.5 to 19 wt. % of maleic anhydride units and 0.5 to 19 wt. % of glycidyl methacrylate units, having a number-average molecular Weight of 5,000 to 100,000.

The invention further provide a new copolymer comprising 80 to 99 wt. % of styrene units, 0.5 to 19 wt. % of maleic anhydride units and 0.5 to 19 wt. % of glycidyl methacrylate units, having a number-average molecular weight of 5,000 to 100,000.

Namely, the present invention provides:
1) a molding resin composition prepared by mixing
   (A) 70 to 99.5% by weight of a resin mixture comprising
      (a) 5 to 95% by weight of a polyamide resin and (b) 95 to 5% by weight of a thermoplastic polyester resin with (B) 0.5 to 30% by weight of a polymer prepared by the copolymerization of (c) 80 to 98% by weight of an aromatic vinyl compound, (d) 19 to 1% by weight of an $\alpha,\beta$-unsaturated carboxylic acid and (e) 19 to 1% by weight of an unsaturated epoxy compound, and 2) a molding resin composition prepared by mixing 50 to 90% by weight of a mixture comprising (A) 70 to 99.5% by weight of a resin mixture comprising (a) 5 to 95% by weight of a polyamide resin and (b) 95 to 5 % by weight of a thermoplastic polyester resin with (B) 0.5 to 30% by weight of a polymer prepared by the copolymerization of (c) 80 to 98% by weight of an aromatic vinyl compound, (d) 19 to 1% by weight of an $\alpha,\beta$-unsaturated carboxylic acid and (e) 19 to 1% by weight of an unsaturated epoxy compound, with (f) 50 to 10% by weight of a glass fiber.

The term "polyamide resin" as used in this specification refers to various ones prepared by the polycondensation of a lactam of an at least three-membered ring an $\omega$-aminocarboxylic acid or a combination of a dibasic acid and a diamine.

Particular examples of the polyamide resin include polymers of $\epsilon$-caprolactam, aminocaproic acid, enantholactam, 7-aminoheptanoic acid or 11-aminoundecanoic acid; polymers prepared by the polycondensation of a diamine such as butanediamine, hexamethylenediamine, nonamethylenediamine, undecamethylenediamine, dodecamethylenediamine or m-xylylenediamine with a dicarboxylic acid such as terephthalic, isophthalic, adipic, sebacic, dodecanedicarboxylic or glutaric acid; and copolymers of them.

More particular examples of the polyamide resin include aliphatic polyamide resins such as nylon 46, nylon 6, nylon 66, nylon 610, nylon 11, nylon 12 and nylon 612; and aromatic polyamide resins such as polyhexamethyleneterephthalamide, polyhexamethyleneisophthalamide and xylylene-containing polyamide, among which nylon 6, nylon 66 and nylon 12 are particularly preferred.

It is preferred that the number-average molecular weight of the polyamide resin be in the range of 10,000 to 35,000.

The thermoplastic polyester resin to be used in the present invention is one having a skeleton constituted of a glycol having 2 to 6 carbon atoms such as ethylene glycol, propylene glycol, butanediol, neopentyl glycol or hexanediol and a dicarboxylic acid such as terephthalic or isophthalic acid or a derivative thereof having, for example, a halogenated or alkylated nucleus and particular examples thereof include not only polyethylene terephthalate, polypropylene terephthalate, polybutylene terephthalate, polyhexylene terephthalate, polyethylene nephthalate, polybutylene naphthalate, polyethylene 1,2-bis(phenoxy) ethane-4,4'-dicarboxylate but also copolyesters such as polyethylene isophthalate terephthalate, polybutylene isophthalate terephthalate and polybutylene terephthalate decanedicarboxylate, among which polyethylene terephthalate and polybutylene terephthalate are preferred in respect of the balance between mechanical strengths and moldability.

It is preferred that the number-average molecular weight of the thermoplastic polyester resin to be used be in the range of 10,000 to 350,000.

The polymer (B) according to the present invention is composed of an aromatic vinyl compound as a main component, an $\alpha,\beta$-unsaturated carboxylic acid and an unsaturated epoxy compound.

The aromatic vinyl compound may be one or more members selected from among styrene, $\alpha$-methylstyrene, $p$-methylstyrene, $p$-butylstyrene, halogenated styrene, vinylxylene and so on.

Examples of the $\alpha,\beta$-unsaturated carboxylic acid include acrylic, methacrylic, maleic, methylmaleic, chloromaleic,, itaconic, citraconic, fumaric, crotonic, mesaconic, succinic and tetrahydrophthalic acids and anhydrides thereof, among which maleic anhydride is most desirable.

Examples of the unsaturated epoxy compound include glycidyl methacrylate, glycidyl acrytate, allyl glycidyl ether, 2-methylallyl glycidyl ether and allylphenyl glycidyl ether, among which glycidyl methacrylate is preferable.

The $\alpha,\beta$-unsaturated carboxylic acid and the unsaturated epoxy compound are essential to the polymer (B). The content of each of them is 19 to 1% by weight. It is preferable that the content of the carboxylic acid be 19 to 1% by weight and that of the epoxy compound be 10 to 1% by weight. If the total content of the carboxylic acid and the epoxy compound in the polymer exceeds 20% by weight, remarkable reactions including partial cross-linking will occur among the polymers in the course of the preparation of the resin composition of the present invention by melt kneading to cause bubbling or lowering in the fluidity, thus seriously impairing the moldability unfavorably. On the contrary, if the total content is less than 2% by weight, the dispersed state of the polyamide and the thermoplastic polyester resin will be heterogeneous, so that the obtained molded article will exhibit unsatisfactory mechanical strengths and have defects in appearance such as delamination.

The polymer (B) may be prepared by the well-known so-called radical copolymerization process. The process may be any one selected from among, for example, solution, emulsion, bulk, and suspension polymerization processes. It is preferred that the number-average molecular weight of the formed polymer be in the range of 10,000 to 150,000. If the molecular weight is less than 10,000, the polymer will exhibit such a low melt viscosity that it will be difficult to knead the polymer together with the polyamide resin and glass fiber to be mixed therewith . On the contrary, if it exceeds 150,000, the polymerization conditions will be severely limited to result in difficult polymerization.

Although the glass fiber to be used in the present invention may be any one which is conveniently used in the preparation of FRTP (glass fiber-reinforced thermoplastic resin), a fiber of E-glass having a diameter of about 8 to 20 $\mu$m is particularly preferable . Although the Surface treatment of the glass fiber is not particularly limited, a glass fiber treated with a silane coupling agent is favorably used. The form of the glass fiber may be either a chopped strand or a roving. The amount of the glass fiber added may be 50 to 10% by weight based on the fiber composition. The addition of the glass fiber in an amount exceeding 50 % by weight gives poor moldability unfavorably.

According to the present invention, the content of the polymer (B) is 0.5 to 30% by weight, while the total content of the polyamide resin and the thermoplastic polyester resin is 70 to 99.5% by weight.

When the content of the polymer (B) is below the lower limit, the dispersed state of the polyamide resin and the thermoplastic polyester resin is so heterogeneous that no satisfactory mechanical strengths can be attained like in a case wherein the total content of the unsaturated dicarboxylic acid and the unsaturated epoxy compound in the copolymer (B) is too low. On the contrary, when it exceeds the upper limit, the resulting composition exhibits properties similar to those of the polymer (B) itself, thus being unsatisfactory in respect of heat resistance and mechanical strengths.

The polyamide resin and the thermoplastic polyester resin may be blended in an arbitrary ratio as long as the proportion of the former resin is 5 to 95% by weight and that of the latter resin is 95 to 5% by weight. The polymer (B) and the mixture (A) are blended in such a ratio as to give a content of the mixture (A) of 70 to 99.5% by weight.

The resin composition of the present invention may further contain a fibrous reinforcement such as metal fiber, aramid fiber, ceramic fiber, potassium titanate whisker, carbon fiber or asbestos; or a granular reinforcement such as talc, calcium carbonate, mica, clay, titanium oxide, aluminum oxide, glass flake, milled fiber, metal flake or metal powder.

Further, the resin composition of the present invention may contain one or more additives such as heat stabilizer, antioxidant, photostabilizer, lubricant, pigment, flame retardant and/or plasticizer.

Although the process for the preparation of the resin composition of the present invention is not particularly limited, the composition is preferably prepared by simultaneously blending all of the polyamide resin, the thermoplastic polyester resin, the polymer (B) and, if necessary, the glass fiber by the use of known melt kneading means such as an extruder, a kneader, a Banbury mixer or the like.

Generally speaking, the blend of different kinds of polymers can scarcely form a homogeneous sea-island structure owing to poor compatibility among the polymers, which exerts undesirable influences upon the appearance and mechanical, physical and chemical properties of a molded article of the blend. According to the present invention, however, the dispersed state of a polyester resin and a polyamide resin can be remarkably improved by the addition of a specified amount of a specified stryene copolymer to give a composition which is remarkably improved in processability and water resistance without deteriorating the various properties inherent in the resins. Further, this composition can be filled with a glass fiber to give a glass fiber-reinforced molding resin composition which is remarkably improved in mechanical strengths and heat distortion temperature.

The invention provides the new copolymer B produced by polymerization at a low cost and which is available as a compatibilizer for the polyester resin and polyamide resin. The present invention has been accomplished on the basis of this finding.

Thus the present invention provides a styrene-maleic anhydride-glycidyl methacrylate random copolymer having a number-average molecular weight of 5,000 to 100,000 which comprises:

80 to 99% by weight of structural units of the formula:

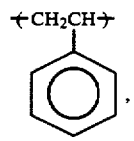

0.5 to 19% by weight of structural units of the formula:

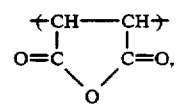

0.5 to 19% by weight of structural units of the formula:

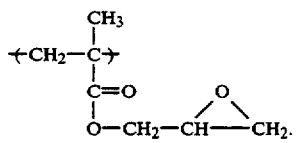

The acid anhydride group of the terpolymer of the present invention rapidly reacts with a terminal amino group of the polyamide resin. The epoxy group of the glycidyl methacrylate unit of the terpolymer is highly compatible with the polyester resin. Therefore, when a specified amount of the terpolymer of the present invention is homogeneously mixed with a mixture of the polyester resin and the polyamide resin, a homogeneous dispersion can be obtained. A polymerization process for obtaining the copolymer of the present invention comprises a well-known so-called radical copolymerization process. The process may be any one selected from among, for example, solution, emulsion, bulk, and, suspension polymerization processes.

The number-average molecular weight of the obtained copolymer is preferably in the range of about 5,000 to 100,000 (in terms of standard polystyrene) as determined according to gel permeation chromatography. If the molecular weight is less than 5,000, the melt viscosity thereof is insufficient and the kneading of the polyester resin with the polyamide resin becomes difficult unfavorably. On the contrary, a copolymer having a number-average molecular weight exceeding 100,000 is unsuitable for use as the compatibilizer, since severe polymerization conditions are necessitated to make the polymerization difficult.

As for the proportions of the components of the copolymer of the present invention, 80 to 99% by weight of the styrene structural units of the formula:

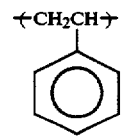

and each 0.5 to 19% by weight of maleic anhydride structural units and glycidyl methacrylate structural units of the formula:

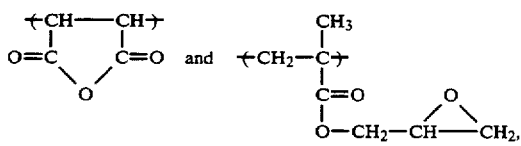

are essential.

When the total content of the maleic anhydride structural units and the glycidyl methacrylate structural units in tile copolymer exceeds 20% by weight of the whole copolymer in the melt-kneading of the copolymer as tile compatibilizer with a mixture of the polyester resin and polyamide resin, remarkable reactions including partial cross-linking will occur among the polymers to cause bubbling or lowering in the fluidity, thus seriously impairing the moldability unfavorably. On the contrary, if the total content is less than 1% by weight, the dispersed state of the polyester resin and tile polyamide resin will be heterogeneous and, so that the obtained molded article will exhibit unsatisfactory mechanical properties and have defects in appearance such as delamination.

Generally speaking, the blend of different kinds of polymers can scarcely form a homogeneous sea-island structure owing to poor compatibility among the polymers, which exerts undesirable influences upon the appearance and mechanical, physical and chemical properties of a molded article of the blend. According to the present invention, however, the dispersed state of the multicomponent polymer system, polyamide resin and the compatibility can be remarkably improved by the addition Of the styrene-maleic anhydride-glycidyl methacrylate copolymer thereto.

In addition, the mixture of the polyester resin and the polyamide resin containing the copolymer of the present invention gives a molding resin composition having a high impact resistance and a remarkably improved, water resistance, while keeping various properties inherent in the polyester resin and the polyamide resin.

Figure 1:
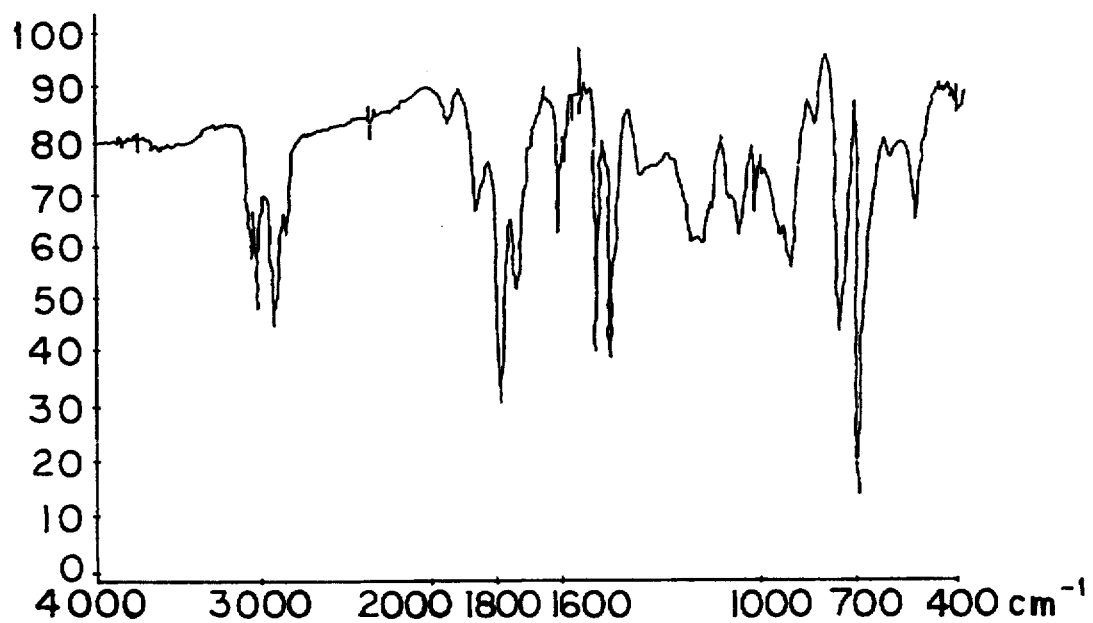
FIG. 1 shows an infrared absorption spectrum of the styrene-maleic anhydride-glycidyl methacrylate copolymer (3)

The invention will below be illustrated in reference to examples of the composition and the copolymer B. The copolymer B is shown by Preparation Examples 1 and 2 and then Copolymer Examples 3 and 4. The composition is shown by Examples 1 to 13.

EXAMPLE

The present invention will now be described in detail by referring to the following Examples.

In each of the Examples, all parts and percentages are by weight.

Preparative Example 1

(preparation of styrene-glycidyl methacrylate-maleic anhydride copolymer (1))

A monomer mixture comprising 680 parts of styrene (hereinafter referred to as "St") and 30 parts of glycidyl methacrylate (hereinafter referred to as "GMA") was dissolved in 750 parts of methyl ethyl ketone (hereinafter referred to as "MEK") in a four-necked flask fitted, with a dropping funnel, a nitrogen gas inlet tube, a thermometer, a condenser and a stirring rod. The temperature of the solution was raised to 70° C. A solution of 15 parts of azobisisobutyronitrile (hereinafter referred to as "AIBN") as a polymerization initiator in 150 parts of MEK was dropped into the above solution to initiate polymerization. A monomer mixture comprising 300 parts of St, 30 parts of maleic anhydride (hereinafter referred to as "MAH") and 20 parts of MEK was stepwise dropped thereinto to continue the polymerization.

After 10 hours, the reaction mixture was cooled to a room temperature and immediately poured into a large amount of methanol to precipitate a polymer. This polymer was recovered by decantation, vacuum-dried in a vacuum dryer and finely pulverized to give a styrene-glycidyl methacrylate-maleic anhydride copolymer (1).

This copolymer exhibited a number-average molecular weight of 15,000 (in terms of polystyrene) as determined by GPC.

Preparative Example 2

(preparation of styrene-glycidyl methacrylate-maleic anhydride copolymer ( 2))

A monomer mixture comprising 700 parts of St and 70 parts of GMA was dissolved in 300 parts of MEK in the same equipment as that used in the preparation of the styrene-glycidyl methacrylate-maleic anhydride copolymer ( 1). The temperature of the obtained solution was raised to 70° C. A solution of 15 parts of AIBN in 150 parts of MEK was dropped into the solution to initiate polymerization. A monomer mixture comprising 270 parts of St, 40 parts of MAH and 20 parts of MEK was stepwise dropped thereinto to continue the polymerization.

After 10 hours, the reaction mixture was treated in a similar manner to that of Preparation Example 1 to give a powdered styrene-glycidyl methacrylate-maleic anhydride copolymer (2).

This copolymer exhibited a number-average molecular weight of 26,000 (in terms of polystyrene) as determined by GPC.

EXAMPLES 1 and 2

A nylon 6 (a product of Ube Industries, Ltd., Nylon 6 1013B; hereinafter referred to as "Nylon 6") and a polybutylene terephthalate resin (a product of Polyplastics, Co., Ltd., Duranex 2000; hereinafter referred to as "PBT") were weighed out so as to give a weight ratio of Nylon 6 to PBT of 6:4. 5 parts of the styrene-glycidyl methacrylate-maleic anhydride copolymer (1) prepared in Preparative Example 1 and 10 parts of the styrene-glycidyl methacrylate-maleic anhydride copolymer (2) prepared in Preparative Example 2 were each mixed with the Nylon 6 and PBT weighed out above to make up to a total amount of 100 parts. The obtained mixtures were each treated in a Henschel mixer at a room temperature for 15 minutes.

The obtained resin compositions were each melt-mixed and pelletized with a single-screw extruder (40 mmφ) at 240° C. and molded into predetermined test pieces with an injection molding machine at 240° C.

The test pieces thus prepared were examined for flexural modulus ( thickness of sample: 3.2 mm, temperature of measurement: 23° C.; hereinafter referred to as "FM") according to JIS K 7203, for Izod impact strength (thickness of sample: 3.2 mm, temperature of measurement: 23° C., notched; hereinafter referred to as "IS") according to JIS K 7110 and for heat deformation temperature (thickness of sample: 3.2 mm, bending stress: 4.6 kgf/cm$^2$ and 18.6 kgf/cm$^2$, not annealed; hereinafter referred to as "HDT") according to JIS K 7207.

Comparative Example 1

For comparison, without using the styrene-glycidyl methacrylate-maleic anhydride (1) or (2), a mixture comprising Nylon 6 and PBT in a ratio of 6:4 was melt-kneaded and injection-molded into a test piece in a similar manner to that described in Examples 1 and 2.

This test piece was examined for physical properties in the same manner as that described in Examples 1 and 2.

EXAMPLE 3 and 4

Nylon 6 and PBT were weighed out so as to give a ratio of 4:6. 10 parts of the styrene-glycidyl methacrylate-maleic anhydride copolymer (1) prepared in Preparative Example 1 and 5 parts of the styrene-glycidyl methacrylate-maleic anhydride copolymer (2) prepared in Preparative Example 2 were each mixed with the Nylon 6 and PBT weighed out above to make up to a total amount of 100 parts. The obtained mixtures were each melt-kneaded and injection-molded into test pieces in a similar manner to that described in Examples 1 and 2.

The test pieces thus prepared were examined for physical properties in the same manner as that described in Examples 1 and 2.

Comparative Example 2

For comparison, without using the styrene-glycidyl mechacrylate-maleic anhydride copolymer (1) or (2), a mixture comprising Nylon 6 and PBT in a ratio of 4:6 was melt-kneaded and injection-molded into a test piece in a similar manner to that described in Examples 1 and 2.

This test piece was examined for physical properties in the same manner as that described in Examples 1 and 2.

Comparative Example 3

For comparison, without using the styrene-glycidyl methacrylate-maleic anhydride copolymer (2), a mixture comprising Nylon 66 and PBT in a ratio of 6:4 was melt-kneaded and injection-molded into a test piece in a similar manner to that described in Examples 1 and 2.

This test piece was examined for physical properties in the same manner as that described in Examples 1 and 2.

EXAMPLE 6

Nylon 66 and PBT were weighed out so as to give a ratio of 4:6. 10 parts of the styrene-glycidyl methacrylate-maleic anhydride copolymer (2) prepared in Preparative Example 2 was mixed with the Nylon and PBT weighed out above to make up to a total amount of 100 parts. The obtained mixture was melt-kneaded and injection-molded into a test piece in a similar manner to that described in Examples 1 and 2.

This test piece was examined for physical properties in the same manner as that described in Examples 1 and 2.

Comparative Example 4

For comparison, without using the styrene-glycidyl methacrylate-maleic anhydride (2), a mixture comprising Nylon 66 and PBT in a ratio of 4:6 was melt-kneaded and injection-molded into a test piece in a similar manner to that described in Examples 1 and 2.

This test piece was examined for physical properties in the same manner as that described in Examples 1 and 2.

All of the results of the examinations are given in Table 1.

TABLE 1

|  | Ex. No. | | | | | | Comp. Ex. No. | | | |
|---|---|---|---|---|---|---|---|---|---|---|
|  | 1 | 2 | 3 | 4 | 5 | 6 | 1 | 2 | 3 | 4 |
| Nylon 6 (parts) | 57 | 54 | 36 | 38 | — | — | 60 | 40 | — | — |
| Nylon 66 (parts) | — | — | — | — | 57 | 36 | — | — | 60 | 40 |
| PBT (parts) | 38 | 36 | 54 | 57 | 38 | 54 | 40 | 60 | 40 | 60 |
| Copolymer (1) | 5 | — | 10 | — | — | — | — | — | — | — |
| Copolymer (2) | — | 10 | — | 5 | 5 | 10 | — | — | — | — |
| FM (kg/cm$^2$) | 22,000 | 22,500 | 23,500 | 22,500 | 26,500 | 25,000 | 22,000 | 23,000 | 26,500 | 25,500 |
| IS (kg · cm/cm) | 12.4 | 13.4 | 8.7 | 6.3 | 9.6 | 7.2 | 2.1 | 1.5 | 2.5 | 2.1 |
| HDT (°C.) (4.6 kg/cm$^2$) | 171 | 168 | 161 | 165 | 191 | 168 | 175 | 168 | 200 | 177 |
| HDT (°C.) (18.6 kg/cm$^2$) | 59 | 61 | 63 | 57 | 75 | 77 | 57 | 57 | 73 | 70 |

This test piece was examined for physical properties in the same manner as that described in Examples 1 and 2.

EXAMPLE 5

A nylon 66 (a product of Polyplastics, Co., Ltd., Polyplanylon 66 1000-2; hereinafter referred to as "Nylon 66") and PBT were weighed out so as to give a ratio of 6:4. 5 parts of the styrene-glycidyl methacrylate-maleic anhydride copolymer (2) prepared in Preparative Example 2 was mixed with the Nylon 66 and PBT weighed out above to make up to a total amount of 100 parts. The obtained mixture was melt-kneaded and injection-molded into a test piece in a similar manner to that described in Examples 1 and 2.

EXAMPLE 7 to 9

Nylon 6 and PBT were weighed out so as to give a ratio of 7:3, 5:5, or 3:7. 3.5 parts of the styrene-glycidyl methacrylate-maleic anhydride copolymer (1) prepared in Preparative Example 1 was mixed with the Nylon and PBT weighed out above to make up to a total amount of 70 parts. A glass fiber (a product of Nippon Electric Glass Co., Ltd., ECSO 3 T-289/P, 3 mm cut; hereinafter referred to as "Glass fiber T-289 ") was added to each of the mixtures prepared above and the obtained mixtures were each treated in a Henschel mixer at a room temperature for 15 minutes.

The obtained resin compositions were each melt-kneaded and pelletized with a twin-screw extruder (50 mm$\phi$) at 260° C. and injection-molded into a predetermined test piece with an injection molding machine at 260° C.

The test pieces thus prepared were examined for physical properties and the results are given in Table 2.

Comparative Examples 5 to 7

For comparison, without using the styrene-glycidyl methacrylate-maleic anhydride copolymer (1), Nylon 6, PBT and Glass fiber T-289 were mixed, melt-kneaded and injection-molded into test pieces in a similar manner to that described in Examples 7 to 9.

The test pieces thus prepared were each examined for physical properties and the results are given in Table 2.

EXAMPLES 10 and 11

A nylon 66 (a product of Polyplastics, Co., Ltd., Polyplanylon 66 1000-2; hereinafter referred to as "Nylon 66") and PBT were weighed out so as to give a ratio of 7:3 or 3:7. 3.5 parts of the styrene-glycidyl methacrylate-maleic anhydride copolymer (1) prepared in Preparative Example 1 was mixed with the Nylon 66 and PBT weighed out above to make up to a total amount of 70 parts. Glass fiber T-289 was added to each of the mixtures prepared above and the obtained mixtures were each treated in a Henschel mixer, melt-kneaded and injection molded into predetermined test pieces in a similar manner to that described in Examples 7 to 9.

The test pieces thus prepared were examined for physical properties and the results are given in Table 2.

EXAMPLES 12 and 13

Nylon 6 and PBT were weighed out so as to give a ratio of 7:3 or 3:7. 3.5 parts of the styrene-glycidyl methacrylate -maleic anhydride copolymer (1) prepared in Preparative Example 1 was mixed with the Nylon 6 and PBT weighed out above to make up to a total amount of 70 parts, followed by the addition thereto of a glass fiber (a product of Nippon Electric Glass Co., Ltd., ECSO 3 T-187/P, 3 mm cut; hereinafter referred to as "Glass fiber T-187"). The mixtures thus prepared were each treated in a Henschel mixer, melt-kneaded and injection-molded into test pieces in a similar manner to that described in Examples 7 to 9.

The test pieces thus prepared were examined for physical properties.

All of the results of the examinations are given in Table 2.

dissolved in 1000 g of methyl ethyl ketone (hereinafter referred to as "MEK") in a four-necked flask fitted with a dropping funnel, a nitrogen inlet tube, a thermometer, a condenser and a stirrer and the solution was heated to 70° C. Another monomer mixture comprising 15 g of azobisisobutyronitrile (hereinafter referred to as "AIBN") as the polymerization initiator, 260 g of St, 70 g of maleic anhydride (hereinafter referred to as "MAH") and 280 g of MEK was stepwise dropped thereinto to initiate polymerization. After 10 h, the flask was cooled to room temperature arid the reaction mixture was immediately poured into a large quantity of methanol. The polymer thus precipitated was recovered by decantation, dried under reduced pressure in a vacuum drier axed Finely pulverized to give 870 g of styrene-maleic anhydride glycidyl methacrylate copolymer (3). According to GPC, the copolymer (3) had a number-average molecular weight ( in terms of polystyrene ) of 15,000. The infrared absorption spectrum of the copolymer (3) is given in FIG. 1.

In FIG. 1, characteristic absorption peaks of the anhydride group are observed at 1860 and 1780 cm¹, and characteristic absorption of the ester group of glycidyl methacrylate (1730 cm¹) and peaks of styrene (1600 760, 700 cm¹, etc.) could be observed.

Figure 2:
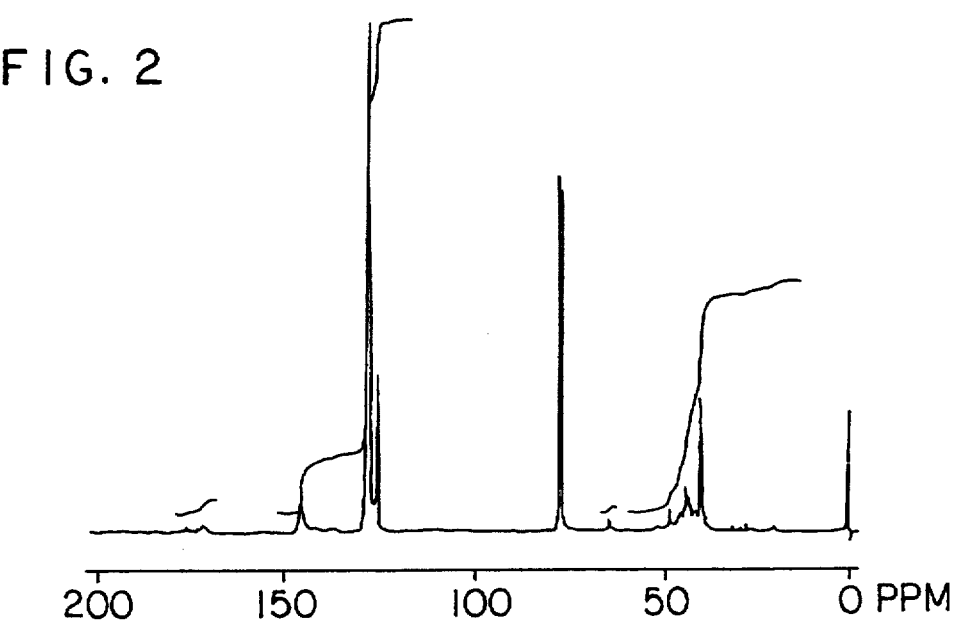
FIG. 2 shows a $^{13}$C-nuclear magnetic resonance absorption spectrum of the copolymer (3).

The $^{13}$C-nuclear magnetic resonance absorption spectrum of the copolymer (3) is given in FIG. 2.

In FIG. 2, peaks of glycidyl methacrylate and maleic anhydride such as [CDCl₃, 46, 49 ppm

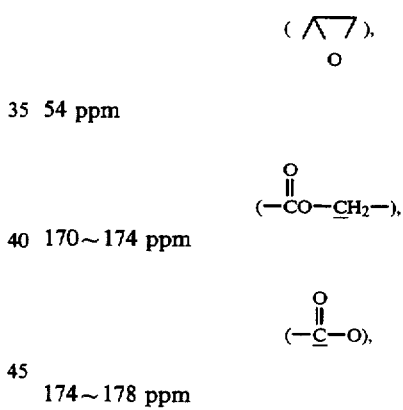

54 ppm

170~174 ppm

174~178 ppm

TABLE 2

|  | Ex. No. | | | | | | | Comp. Ex. No. | | |
| --- | --- | --- | --- | --- | --- | --- | --- | --- | --- | --- |
|  | 7 | 8 | 9 | 10 | 11 | 12 | 13 | 5 | 6 | 7 |
| Nylon 6 (parts) | 46.55 | 33.25 | 19.95 | — | — | 46.55 | 19.95 | 49 | 35 | 21 |
| Nylon 66 (parts) | — | — | — | 46.55 | 19.95 | — | — | — | — | — |
| PBT (parts) | 19.95 | 33.25 | 46.55 | 19.95 | 46.55 | 19.95 | 46.55 | 21 | 35 | 49 |
| Copolymer (1) (parts) | 3.5 | 3.5 | 3.5 | 3.5 | 3.5 | 3.5 | 3.5 | — | — | — |
| Glass fiber T-289 (parts) | 30 | 30 | 30 | 30 | 30 | — | — | 30 | 30 | 30 |
| Glass fiber T-187 (parts) | — | — | — | — | — | 30 | 30 | — | — | — |
| FM (kg/cm²) | 72,000 | 76,000 | 78,000 | 76,000 | 81,000 | 73,000 | 79,000 | 70,000 | 75,000 | 77,000 |
| IS (kg · m/cm²) | 12.9 | 11.9 | 10.0 | 12.4 | 9.8 | 10.3 | 10.9 | 8.7 | 7.7 | 6.1 |
| HDT (°C.) (4.6 kg/cm²) | 216 | 218 | 216 | 259 | 224 | 217 | 218 | 216 | 217 | 216 |
| HDT (°C.) (18.6 kg/cm²) | 198 | 200 | 200 | 241 | 212 | 200 | 202 | 197 | 200 | 199 |

Copolymer Example 3

(Preparation of styrene-maleic anhydride-glycidyl methacrylate copolymer (3))

A monomer mixture comprising 600 g of styrene (hereinafter referred to as "St") and 70 g of glycidyl methacrylate (hereinafter referred to as "GMA") was

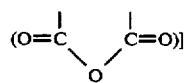

can be confirmed.

Further a peak similar to that of polystyrene is also observed.

In the $^1$H-nuclear magnetic resonance absorption spectrum, the ratio of the constituents could not be analyzed, since the peak of styrene was high and the integrated intensity of the absorption peak of glycidyl methacrylate was unclear.

The results of the elementary analysis of the copolymer (3) are given in Table 3. The calculated values given in Table 3 were obtained on the assumption that the monomers were completely polymerized into the polymers. Comparing them, it can be understood that the monomers used are substantially completely polymerized.

TABLE 3

| Elementary analysis of copolymer (3) | | | |
|---|---|---|---|
| | C (%) | H (%) | N (%) |
| Observed value | 84.44 | 7.17 | 0.20 |
| Calculated value | 84.61 | 7.05 | 0.17 |

Copolymer Example 4

(Preparation of styrene-maleic anhydride-glycidyl methacrylate copolymer (4))

A monomer mixture comprising 1360 g of St and 20 g of GMA was dissolved in 650 g of MEK in the same apparatus as that of Example 3 and the solution was heated to 70° C. Then another monomer mixture comprising 30 g of AIBN, 600 g of St, 20 g of MAH and 280 g of MEK was stepwise dropped thereinto to initiate polymerization.

After 10 h, the flask was cooled to room temperature and the reaction mixture was immediately poured into a large quantity of methanol. The polymer thus precipitated was recovered by decantation, dried under reduced pressure in a vacuum drier and finely pulverized to give 1800 g of styrene-maleic anhydride-glycidyl methacrylate copolymer (4). According to GPC, the resin had a number-average molecular weight (in terms of polystyrene ) of 21,000.

The compatibilizing effect of the copolymer (4) was evaluated in Experimental Example 1 given below.

Comparative Example 8

(Preparation of styrene-maleic anhydride copolymer)

A monomer mixture comprising 800 g of St and 10 g of MAH was dissolved in 500 g of MEK in the same apparatus as that of Example 3 and the solution was heated to 70° C. Then another monomer mixture comprising 15 g of AIBN, 180 g of St, 10 g of MAH and 100 g of MEK was stepwise dropped thereinto to initiate polymerization.

After 10 h, the same procedure as that of Example 3 was repeated to give 920 g of a pulverized styrene-maleic anhydride copolymer. According to GPC, the resin had a number-average molecular weight (in terms of polystyrene) of 28,000.

Comparative Example 9

(Preparation of styrene-glycidyl methacrylate copolymer)

A monomer mixture comprising 980 g of St and 20 g of GMA was dissolved in 600 g of MEK in the same apparatus as that of Example 3 and the temperature was elevated to 70° C. Then 15 g of AIBN was dropped thereinto to initiate polymerization. After 10 h, the same procedure as that of Example 3 was repeated to give 910 g of a pulverized styrene-glycidyl methacrylate copolymer.

According to GPC, the resin had a number-average molecular weight (in terms of polystyrene) of 25,000.

Experimental Example 1

A component (a) comprising 3 g of the styrene-maleic anhydride-glycidyl methacrylate copolymer (4) obtained in Example 4, and a component (b) comprising a mixture of 1.5 g of the styrene-maleic anhydride copolymer obtained in Comparative Example 8 with 1.5 g of the Styrene-glycidyl methacrylate copolymer obtained in Comparative Example 9 were each added to a mixture of 34.2 g of a nylon 6 resin (Nylon 6 1013B, a product of Ube Industries , Ltd.; hereinafter referred to as "Nylon 6 ") and 22.8 g of polybutylene terephthalate (Duranex 2000, a product of Polyplastic, ! CO., Ltd.; hereinafter referred to as "PBT"). The obtained mixtures were each melt-kneaded with a Brabender (at 240° C., 50 rpm) for 5 min. Then pressed plates having a thickness of 3 mm were prepared from each sample at 240° C. under 22 kg/cm$^2$. The compression molded plates were fractured and a scanning electron micrograph of the fractured surface was taken. The sizes of the dispersed particles of PBT and Nylon 6 in each picture were determined. The results are given in Table 4.

TABLE 4

| | Size of dispersed particles of PBT and Nylon 6 | |
|---|---|---|
| Sample | Nylon 6: 34.2 g IPBT: 22.8 g comp. (a): 3 g | Nylon 6: 34.2 g PBT: 22.8 g comp. (b): 3 g (1.5 g + 1.5.g) |
| Diameter of dispersed particles | 0.5 μm or less | 3 to 5 μm |

From these results, it, was confirmed that both maleic anhydride and glycidyl methacrylate are indispensable in the copolymer.

We claim:

1. A molding resin composition, comprising a homogeneous blend of
(A) from 90 to 95 wt. % of mixture A of
 (a) 40–60 wt. % of polyamide resin and
 (b) 60–40 wt. % of thermoplastic polyester resin, and
(B) from 5 to 10 wt. % of a copolymer B containing
 (c) from 80 to 98 wt. % of units derived from an aromatic vinyl compound,
 (d) from 19 to 1 wt. % of units derived from alpha, beta-unsaturated carboxylic acid compound, and
 (e) from 19 to 1 wt. % of units derived from an unsaturated epoxy compound,
Wherein said polyamide resin is selected from the group consisting of Nylon 6 and Nylon 66, said polyester resin is polybutylene terephthalate and copolymer B is a styrene-glycidyl methacrylate-maleic anhydride copolymer.

* * * * *

UNITED STATES PATENT AND TRADEMARK OFFICE
CERTIFICATE OF CORRECTION

PATENT NO. : 5,373,057
DATED : December 13, 1994
INVENTOR(S) : Kazushi Watanabe et al It is certified that error appears in the above-indentified patent and that said Letters Patent is hereby corrected as shown below:

On the title page, item [75], please correct the second inventor's name to read ---Akihiro Izuka---.

In the title page, item [73], please correct the assignee's address to read ---Osaka, Japan---.

Column 14, line 59; change "Wherein" to ---wherein---.

Signed and Sealed this

Twenty-eight Day of March, 1995

Attest:

BRUCE LEHMAN

Attesting Officer     Commissioner of Patents and Trademarks